UNITED STATES PATENT OFFICE.

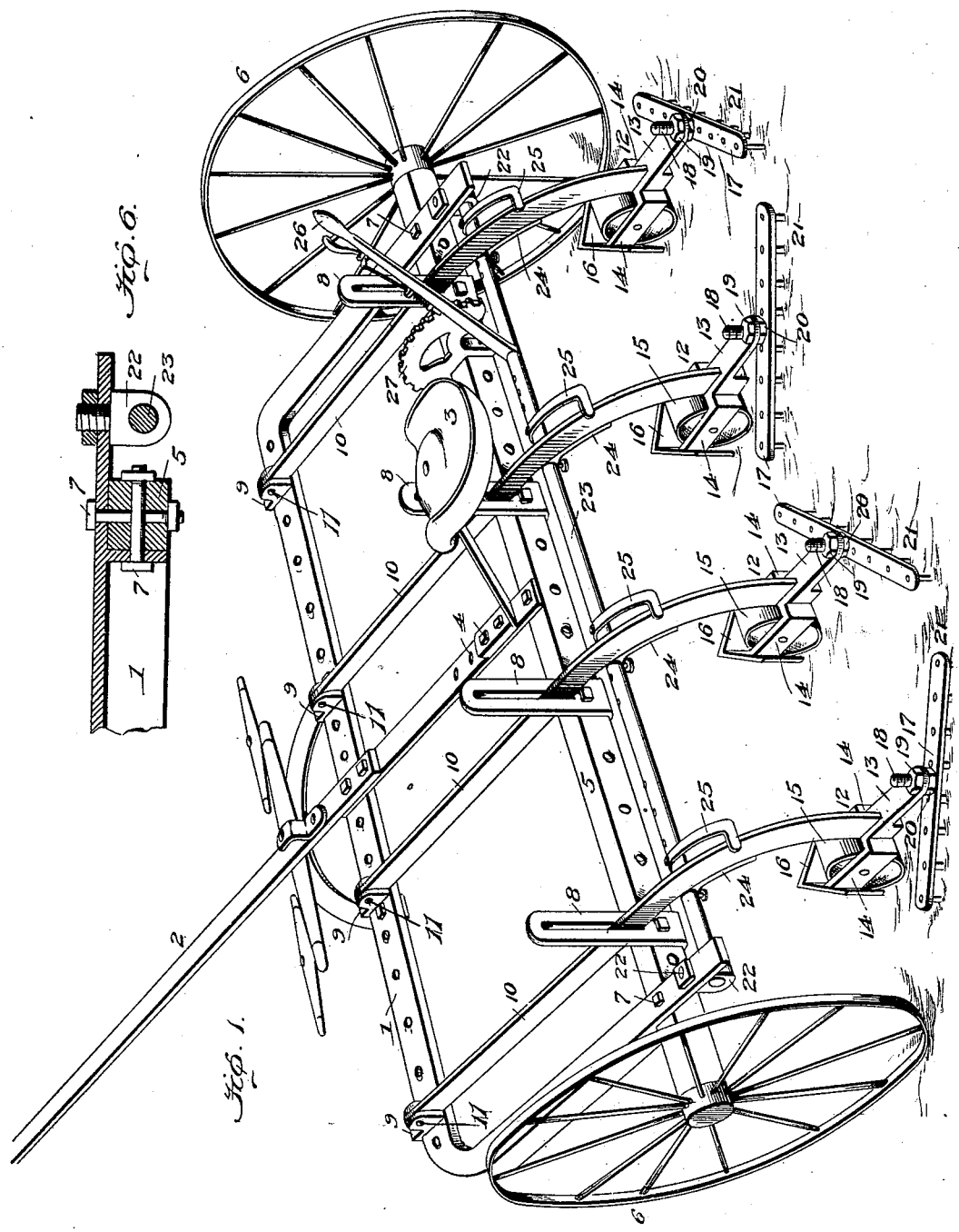

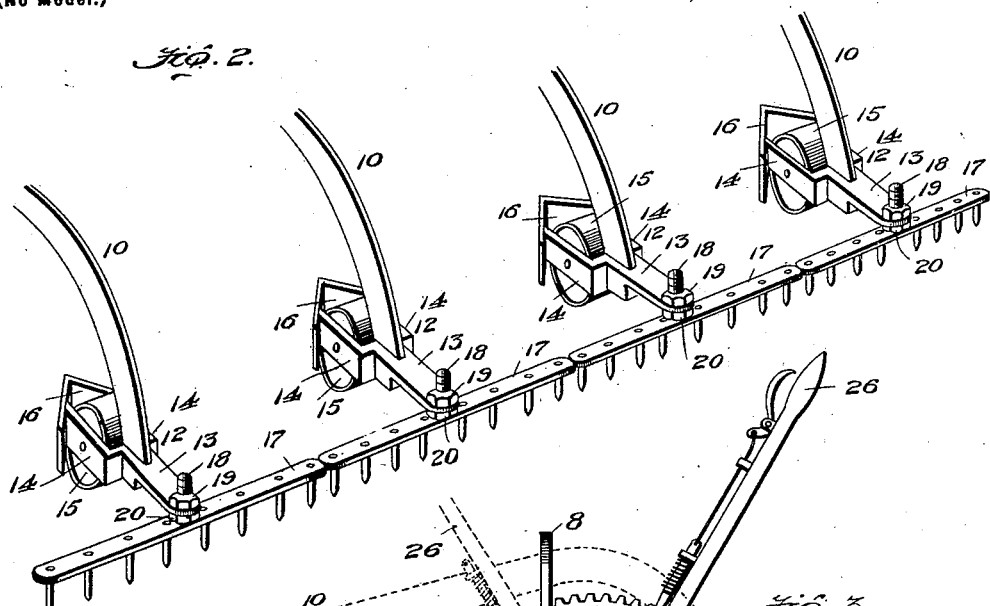
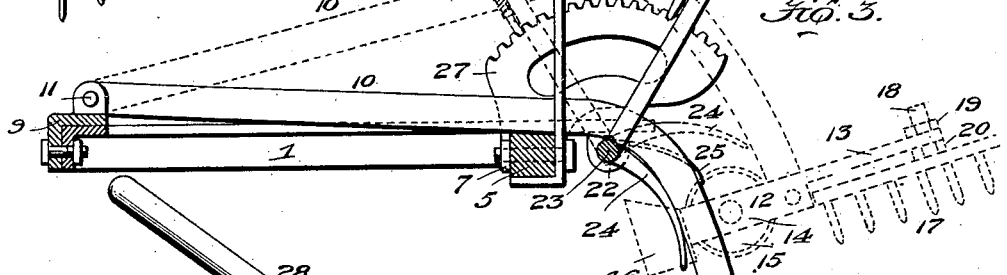
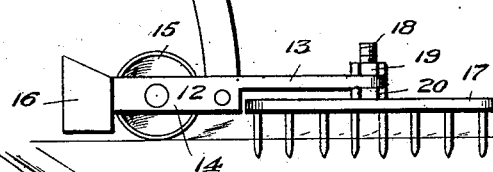
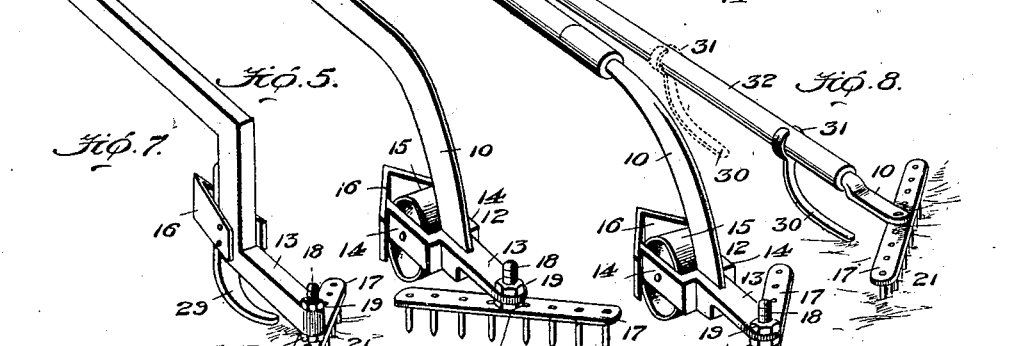

AMOS R. BLACK, OF LAMAR, COLORADO.

AGRICULTURAL RAKE.

SPECIFICATION forming part of Letters Patent No. 711,933, dated October 28, 1902.

Application filed March 22, 1902. Serial No. 99,464. (No model.)

*To all whom it may concern:*

Be it known that I, AMOS R. BLACK, a citizen of the United States, residing at Lamar, county of Prowers, and State of Colorado, have invented certain new and useful Improvements in Agricultural Rakes, of which the following is a specification.

My invention relates to agricultural rakes.

Rainfall or irrigation has a tendency to produce on a seeded field a crust which resists the growth of crops which produce tender sprouts from the seed, and this is particularly true of the field sugar-beet crop, although applicable to a large variety of garden-crops. The crust being of such consistency that it resists the breaking therethrough of the sprouts it has been a problem heretofore to break up this crust without interfering with the seeds.

My object is to provide a mounted agricultural rake which will be adapted, without interfering with the seed, to effectually break up a crust such as heretofore described and to remove the crust from above the rows of planted seeds without interference with the seeds and place the surface of the ground in good arable condition for the rapid growth of the young plant in a cheap, effective, and expeditious manner, thereby affording the tender sprout from the seed the opportunity of coming up without hindrance, obviate the expense of reseeding or replanting, and in many cases prevent the loss of the use of the land for the season.

The invention is intended to render it advisable to irrigate a seeded field or rows of seeds immediately after planting, inasmuch as any crust which may form in consequence of irrigation or heavy rainfall may be broken up and removed without injury to the seed.

Having the foregoing object in view, the present invention consists of a mounted agricultural rake of the improved and novel construction set forth in detail hereinafter and embodied in the appended claims.

In the accompanying drawings, Figure 1 is a perspective view of the invention used as a sulky-rake and arranged to both break up and remove the crust from above the rows of planted seed; Fig. 2, a view in perspective of the rakes as arranged to break up the crust and forming continuations of each other, they being used with a sulky, as shown in Fig. 1; Fig. 3, an enlarged view, partly in cross-section, but mainly in side elevation, illustrating one of the rake constructions and dotted lines representing its position when raised; Fig. 4, a detail view showing how the invention may be used as a hand-rake; Fig. 5, a perspective detail of one of the rake constructions; Fig. 6, a detail sectional view of a portion of the frame construction of the sulky; Fig. 7, a detail illustrating how a shoe can be substituted for the carrying-wheel in the sulky-rake, and Fig. 8 a detail illustrating the adaptation of the invention as a hand garden-rake with a modified form of shoe.

The sulky-frame 1 is of angle-iron construction, and there is provided the usual tongue or pole 2 and a driver's seat 3, which is adjustable at 4, so that the weight of the driver can be thrown forward or backward, as desired. The axle is shown at 5 and the wheels at 6, the axle being bolted to the frame by the crossed bolts 7. (See Fig. 6.) Arising from the axle are slotted guide-plates 8, which are adjustable lengthwise of the axle, so that the distance between the rakes can be varied or a greater or lesser number of mounted rakes employed, so that the crust can be removed from rows of seed planted any distance apart, and for a similar purpose there are employed clips 9, which are adjustable lengthwise of the front portion of frame 1.

The numerals 10 designate the rake-arms, which are detachably pivoted to the clips 9 by bolts 11 and are adapted to play up and down in the slotted guides 8.

On the lower portions of the rake-arms 10 are the brackets or yokes 12, having a single arm 13 extending rearwardly and twin arms extending forwardly of the rake-arm. Journaled to the twin arms 14 and located between them is a carrying-wheel 15, adapted to travel on the surface of the ground and support the weight of the parts carried by the rake-arm and the rake-arm itself.

Secured to the twin arms 14 in front of the carrying-wheel is a fender 16, which is adapted to divert obstructions from the path of the carrying-wheel.

The numeral 17 designates the rake. This is provided with a screw-threaded stem 18, which passes through the arm or projection 13, and on which stem and on opposite sides of the arm 13 are the clamping or jam nuts 19 and 20, which serve the twofold function of clamping the rake in whatever position it may be adjusted, whether inclined, as shown in Figs. 1, 3, and 5, or straight across, as shown in Fig. 2, and for adjusting the rake vertically, so that its teeth will penetrate to a greater or lesser degree in the crust 21. In this connection I desire to state that seed for the kinds of crops heretofore described is usually planted from one-half inch to one and one-half inches deep, and the crust which forms on a seeded field is from one-eighth to one-fourth of an inch thick. Consequently it is necessary that provision be made for different depths of penetration of the rake-teeth in order to break up and remove the crust without injury to the seed.

Journaled in bearings 22 on the sulky-frame is a rock-shaft 23, provided with wiper-arms 24, adapted to bear against the under sides of the rake-arms 10 and also equipped with springs 25, which bear on top of the rake-arms. A suitable hand-lever 26 and toothed sector 27 are provided, by which the rock-shaft 23 can be turned to the desired degree to hold the rake-arms in proper normal position and to cause them to be held down under desired tension of the springs 25, and this lever and sector rack mechanism also provides means for raising all of the rake-arms simultaneously, as shown in dotted lines in Fig. 3, to clear the rakes of rubbish or obstructions when in action or while moving the rake on the road or from field to field or to cross irrigation-ditches.

As shown in Fig. 4, the invention is adapted for use as a hand-rake by making the rake-arm 10 shorter and providing it with a suitable handle 28.

In Fig. 7 I have illustrated how a shoe or runner 29 can be used in substitution for the carrying-wheel 15, this runner traveling along the surface and supporting the rake, while the fender 16 is used as before.

In Fig. 8 the adaptation of the invention as a garden-rake is illustrated. In this instance the fender and mechanical gaging means can be dispensed with and the depth of penetration of the rake-teeth in the earth gaged manually, and the shoe or runner 30 which is employed is provided with a split springy clip-head 31, which embraces the handle 32 and holds the runner in the position to which it may be adjusted on the handle. The runner can also be removed from the handle by slipping it off the end if desired.

In operation the carrying-wheel or runner runs on top of the crust, and the guard or fender diverts to the sides any clods, stalks, or stones which would tend to obstruct the carrying-wheel or runner. The rake or rakes in the case of the sulky construction are adjusted to cause the rake-teeth to penetrate the earth to the depth of the crust. The mounted rake is then moved forward at a quick rate. The weight of the carrying-wheel or runner, the guard, and the rake-arm, supplemented by the pressure of the spring, insures the continuous penetration of the rake-teeth in the earth to the predetermined depth, while in the sulky-mounted rake the gang of rakes will automatically adjust themselves to higher or lower ground between the sulky-wheels. On a seeded field the crust is torn up by the rake-teeth and broken into small fragments and passes back between the rake-teeth without interfering with the seed, and thus allowing the sprouts from the seed to easily penetrate the surface. When used on rows of planted seed, the crust is torn up by the rake-teeth and broken into small fragments and automatically removed from the top of the row by reason of the oblique disposition or inclined arrangement of the rake, but without any interference with the seed, thus leaving the sprouts free to come up. The rake-teeth can be permitted to penetrate the earth to a greater depth than is necessary to uncrust planted seeds, and thus used advantageously before planting seed to finely pulverize the earth and place the land in first-class arable condition necessary for intense cultivation.

In Figure 1 the rakes are shown as adapted for use in both breaking up the crust and removing it, while in Fig. 2 they are shown arranged in alinement as for use on a seeded field to simply rip up or break the crust. In the hand-rakes shown in Figs. 4 and 8 it will be understood that the pressure when needed to keep the rake to its work is applied manually.

I am aware that changes of construction could be resorted to in carrying out my invention, and I do not, therefore, limit myself to the precise construction shown and described, but consider that I am entitled to all variations coming within the spirit and scope of the invention.

It is to be understood that the depth of penetration of the rake or other earth-treating device applied to the arm 10 or like part 28 or 32 is regulable by turning said arm on the shoe 30 or wheel 15, constituting, in effect, a traveler. The front end of the arm or handle 28 or 32 is adapted to be raised or lowered by lifting or dropping the hand holding the same, thereby depressing or elevating the rake or like part attached to the lower end of the arm or handle. When turning the main frame upon the axle, the front ends of the arms 10 are moved up or down, thereby effecting in a limited degree the vertical adjustment of the rakes, since the arms 10 turn upon the wheels 15, which form pivotal supports therefor, as will be readily appreciated.

Having thus described my invention, what I claim as new, and desire to secure by Letters Patent, is—

1. In an agricultural implement and in combination with the carrying-frame, an arm pivoted thereto, an earth-treating device having a threaded stem passed through an opening in the arm, and means for clamping the stem in an adjusted position to the said arm, substantially as described.

2. In an agricultural implement, the combination with the carrying-frame, an arm pivoted thereto and having a vertical opening at its rear end and a traveler applied to the front end of the arm, an earth-treating device having a threaded stem adjustable vertically and angularly in the opening of the arm, and means for clamping the stem to the arm in an adjusted position, substantially as specified.

3. In an agricultural implement, the combination with the carrying-frame and an arm pivoted thereto, an earth-treating device at the rear end of the arm, a fender at the front end of the arm, and a traveler secured to the arm at an intermediate point, substantially as described.

4. In an agricultural implement, a carrying-frame, an arm pivoted thereto and having a fender at its front end, an earth-treating device at its rear end, a traveler in the rear of the fender, and having an operating-arm extended from the said arm at a point between the traveler and the earth-treating device, substantially as described.

5. In an agricultural implement, a carrying-frame, an arm pivoted thereto and having twin arms at its front end, an earth-treating device attached to the rear end of the said arm, a fender secured to the twin arms, and a carrying-wheel journaled between the said twin arms in the rear of the fender, substantially as specified.

6. In an agricultural implement, a carrying-frame, an arm pivoted thereto and having twin arms at its front end, an earth-treating device adjustably connected with the rear end of the single arm, a fender secured to the twin arms, a carrying-wheel journaled between the said twin arms, and an operating-arm attached to the single arm at about the juncture of the twin arms therewith, substantially as set forth.

7. In an agricultural implement, the combination with the carrying-frame and an arm pivoted thereto and provided with an earth-treating device, a rock-shaft, a wiper-arm attached to the rock-shaft for supporting the pivoted arm, and a spring affixed to the said rock-shaft and exerting a yielding down pressure on the pivoted arm at all adjustments thereof, substantially as described.

8. In an agricultural implement, a frame, pivoted arms carrying earth-treating devices and laterally adjustable upon the frame to space the earth-treating devices apart the required distance, guides for directing the arms in their vertical movements and laterally adjustable upon the frame, a rock-shaft, wiper-arms for lifting the free ends of the pivoted arms and adjustable laterally on the rock-shaft, and springs laterally adjustable on the rock-shaft for exerting a yielding down pressure on the free ends of the pivoted arms, substantially as described.

In testimony whereof I hereunto affix my signature in presence of two witnesses.

AMOS R. BLACK.

Witnesses:
 FRANK E. NEWTON,
 SARAH V. LOCKWOOD.